United States Patent
Philippon

(10) Patent No.: US 8,029,678 B2
(45) Date of Patent: Oct. 4, 2011

(54) METHOD FOR TREATING WATER, IN PARTICULAR DRINKING WATER, AND WATER TREATMENT PLANT

(75) Inventor: Luc Philippon, St-Jérome (CA)

(73) Assignee: Degremont, Rueil Malmaison (FR)

( * ) Notice: Subject to any disclaimer, the term of this patent is extended or adjusted under 35 U.S.C. 154(b) by 0 days.

(21) Appl. No.: 11/916,901

(22) PCT Filed: May 30, 2006

(86) PCT No.: PCT/FR2006/001222
§ 371 (c)(1),
(2), (4) Date: Mar. 31, 2008

(87) PCT Pub. No.: WO2006/131619
PCT Pub. Date: Dec. 14, 2006

(65) Prior Publication Data
US 2008/0210642 A1 Sep. 4, 2008

(30) Foreign Application Priority Data
Jun. 8, 2005 (FR) ...................................... 05 05817

(51) Int. Cl.
*C02F 1/78* (2006.01)
(52) U.S. Cl. .. 210/760; 210/205; 261/126; 261/DIG. 42
(58) Field of Classification Search ................... 210/760, 210/764, 192, 150, 151, 198.1, 205, 765, 210/194, 195.1, 620, 631, 721, 790, 255, 210/256; 261/DIG. 42, 119.1, 126; 422/28–33
See application file for complete search history.

(56) References Cited

U.S. PATENT DOCUMENTS

| | | | |
|---|---|---|---|
| 4,049,545 A * | 9/1977 | Horvath | 210/665 |
| 4,252,654 A | 2/1981 | Leitzke et al. | |
| 4,255,257 A * | 3/1981 | Greiner et al. | 210/760 |
| 5,178,755 A | 1/1993 | Lacrosse et al. | |
| 5,275,742 A * | 1/1994 | Satchell et al. | 210/760 |
| 5,711,887 A * | 1/1998 | Gastman et al. | 210/760 |
| 5,968,352 A * | 10/1999 | Ditzler | 210/205 |
| 6,551,519 B1 | 4/2003 | Hartwig | |

FOREIGN PATENT DOCUMENTS

| | | | |
|---|---|---|---|
| EP | 1 153 890 | | 11/2001 |
| FR | 2 429 187 A | | 1/1980 |
| GB | 1521166 A | * | 8/1978 |
| JP | 2000 210685 A | | 8/2000 |

OTHER PUBLICATIONS

Leitzke et al., "Ozone treatment of Surface Water to Provide High Quality Cooling Water and Process water," Ozone: Science and Engineering, vol. 2, pp. 229-239, 1980.*

* cited by examiner

*Primary Examiner* — Nam Nguyen
*Assistant Examiner* — Lucas Stelling
(74) *Attorney, Agent, or Firm* — Connolly Bove Lodge & Hutz LLP

(57) ABSTRACT

The invention concerns a water treatment method including a step of clarification, followed by an ozonization step and at least one filtration step, wherein after the clarification step (1), one fraction of the main stream of water is diverted (9); said diverted fraction of water is circulated counter-current (7) to an ozone-rich carrier gas, and the ozone-enriched fraction of water is diluted in the main stream.

2 Claims, 1 Drawing Sheet

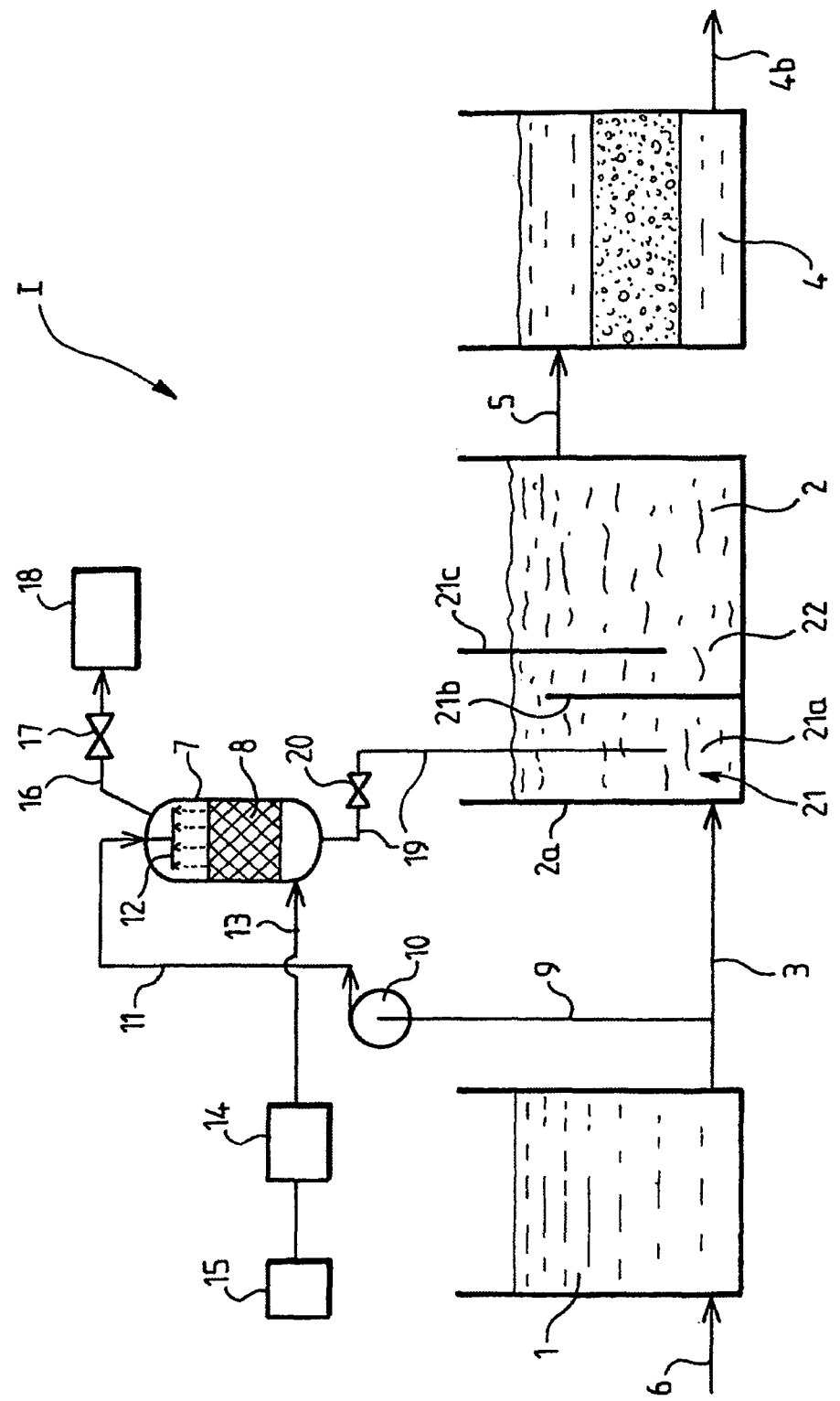

METHOD FOR TREATING WATER, IN PARTICULAR DRINKING WATER, AND WATER TREATMENT PLANT

CROSS REFERENCE TO RELATED APPLICATIONS

This application is a National Phase filing under 35 U.S.C. §371 of PCT/FR2006/001222 filed May 30, 2006, which claims priority to Patent Application No. 0505817, filed in France on Jun. 8, 2005. The entire contents of each of the above-applications are incorporated herein by reference The invention relates to a water treatment method comprising a clarification step, an ozonization step and at least one filtration step.

The clarification step is an operation consisting in clarifying a liquid by filtration, settling, or any other method.

The invention relates more particularly, but not exclusively, to a method for treating drinking water.

Ozonization faces technical difficulties which have not yet been resolved today as satisfactorily as desired.

The ozone is present in a carrier gas. One serious difficulty results from the supersaturation of the water with dissolved carrier gas, which causes clotting of the filters, that is an accumulation of gas phase on the filters, preventing proper filtration. Furthermore, in the case of biological filters, if the ozone carrier gas is oxygen, a supersaturation with dissolved oxygen is harmful to the biological treatment.

As another difficulty, mention can be made of the dispersion of ozone in the treatment installation and in the environment by the degassing of the ozonized water. This degassing is promoted by filtration.

Ozonization is normally carried out in bubbling tanks, by injecting ozone using porous rails into the tank bottom, and by the rise of ozone bubbles in the water to be treated. A high pressure drop due to the degassing method causes a drop of 0.6 to 1.0 m in the hydraulic profile. This pressure drop is added to that generated in the bubbling tanks. Furthermore, a significant decrease in efficiency of the ozone transfer to the water occurs in the warmer summer season, that is, at the time when the ozone is the most useful for controlling tastes and odors.

Moreover, devices for diffusing fine bubbles deteriorate rapidly and require costly maintenance.

From O. Leitzke et al.: "Ozone treatment of surface water to provide high quality cooling water and process water" Ozone: Science and Engineering, Lewis Publishers, Chelsea, Mich., US, vol. 2, No. 3, 1980, pages 229-239, a water treatment method is known comprising a clarification step, an ozonization step and at least one filtration step, whereby a fraction of the main water stream is diverted, said diverted fraction of water is pressurized and delivered to a liquid/gas exchange tower in order to be enriched with ozone present in an air or oxygen carrier gas, and the ozone-enriched fraction of water is diluted in the main stream.

This method has, in particular, the drawback of reducing effective filtration capacity, the fraction of water being tapped off downstream of the filter.

It is the primary object of the invention to provide a water treatment method which remedies most of the drawbacks listed above, particularly by avoiding the reduction of the filtration capacity and by limiting the supersaturation of the water with dissolved gas. It is desirable for the method to substantially improve the ozonization step by promoting the transfer of ozone to the water, while continuing to provide relatively cost-effective implementation and compact size.

The water treatment method according to the invention comprises an ozonization step and at least one filtration step and is characterized in that:
   upstream of the filtration, a fraction of the main water stream is diverted,
   said diverted fraction of water is saturated with ozone at a pressure above atmospheric pressure,
   the untransferred part of the oxygen- and nitrogen-enriched carrier gas is extracted,
   and the ozone-enriched fraction of water is diluted in the main stream upstream of the filtration.

The saturation with ozone can take place in cocurrent mode or in countercurrent mode, or with a combination of the two methods.

Advantageously, the water treatment method comprises a clarification step, an ozonization step and at least one filtration step, and the diverted fraction of the water stream is pressurized and delivered to a liquid/gas exchange tower in order to be enriched with ozone present in an air or oxygen carrier gas, the ozone-enriched fraction of water being diluted in the main stream; the fraction of the main water stream is diverted downstream of a clarification tank and upstream of a contact tank, via the branch of a conduit on a line connecting the clarification tank to the contact tank, a filter being provided after the contact tank.

The invention is distinguished from existing methods by the fact that it reduces the quantity of carrier gas introduced into the main water stream to be treated. This problem is observed with other systems used previously, such as fine bubble systems, static mixer-injectors and others. The invention serves to remove the undesirable part of carrier gas to a saturation or exchange tower. The water is tapped off internally, thereby not affecting the capacity of the filters.

Preferably, the ozone-enriched diverted fraction of water is diluted in the upstream part of the contact tank prepared in the form of a dissolution tank.

The exchange tower behaves like a saturator, so that by saturating the diverted fraction with ozone, it is possible to inject all the desired ozone into the main stream while limiting the injection of oxygen.

The surplus ozone may be recovered at the top of the tower by a line connected to an ozone destroyer.

The stream of the diverted fraction may be between 5% and 10% of the main stream, advantageously about 7.5%.

The carrier gas may be oxygen, and the ozone concentration is at least 5% by weight, advantageously about 10% by weight.

In general, the diverted fraction of water is pressurized before circulating it in countercurrent flow with the ozone-rich gas.

The invention also relates to an installation for treating water, in particular drinking water, comprising a clarification tank, at least one filter, means for producing ozone in an air or oxygen carrier gas, a liquid/gas exchange tower, a branch for diverting a fraction of the main water stream downstream of the clarification tank, said branch comprising pumping means for pressurizing the diverted fraction to deliver it to the tower, intake means for ozone-rich carrier gas in the exchange tower, means for collecting the ozone-enriched diverted fraction of water and for diluting it in the main water stream, characterized in that the fraction of the main water stream is diverted upstream of a contact tank, via the branch of a conduit on a line connecting the clarification tank to the contact tank, a filter being provided after the contact tank.

Preferably, the zone in which the ozone-enriched diverted fraction of water is injected and diluted in the main stream, is located upstream of the filter.

The ozone-enriched diverted fraction of water is diluted in the upstream part of the contact tank prepared in the form of a dissolution tank.

The surplus ozone may be recovered at the top of the tower by a line connected to an ozone destroyer.

Advantageously, the liquid/gas exchange tower operates in countercurrent mode.

The dissolution tank comprises an upstream chamber bounded by the upstream vertical transverse wall of the tank and by a vertical partition parallel to the wall at a distance therefrom, and the height of the partition is lower than the water height in the tank, the partition being connected tightly to the longitudinal walls of the tank so that the passage of the water from the chamber downstream must take place above the upper edge of the partition, at a distance from which another vertical parallel partition is provided, extending above the water level in the tank and stopping at a distance from the bottom of the tank, so that a passage subsists in the bottom portion.

The bypass branch advantageously comprises pumping means for pressurizing the diverted fraction and for introducing it under pressure at the top of the tower. The pressure of the diverted fraction discharged by the pump may be 1.5 to 10 bar absolute, but the pressure is advantageously about 2.3 bar absolute (or 230 kPa). The pressure could be increased using a compressor or a booster. The liquid/gas exchange tower comprises a packing which favors exchanges. This tower may be prepared advantageously from stainless steel capable of withstanding the high ozone concentrations. The tower is also provided to withstand a pressure of about 3 bar.

According to the invention, in addition to carrying out the dissolution of the ozone, the saturator limits the supersaturation with dissolved gas, whereof the consequences could be the clotting of the filters, a degree of toxicity which interferes with the biological treatment, degassing of ozone in the plant, and other drawbacks.

Apart from the provisions discussed above, the invention comprises a number of other arrangements which are more explicitly discussed below with regard to an exemplary embodiment described with reference to the appended drawing, but which is nonlimiting.

In this drawing, the single FIGURE shows a flowchart of part of a water treatment installation according to the invention.

The invention may be applied equally to existing installations comprising a conventional contact tank for ozonization, and to new installations to be built.

The single FIGURE in the drawing shows an installation I for treating drinking water which comprises at least one clarification tank 1 followed by a contact tank 2. A line 3 connects the tanks 1 and 2. At least one filter 4 is provided after the contact tank 2 and is connected thereto by a line 5. The filter 4 may be of the sand filter or biological filter or other type.

The water to be treated enters the clarification tank 1 via a line 6, while the treated water leaves the filter 4 via a line 4b.

In an installation according to the prior art, the contact tank 2 would comprise porous rails in the bottom for the injection of a carrier gas containing ozone for transferring the ozone to the water to be treated. As already stated, such a solution is not fully satisfactory because it generates a supersaturation of the water with carrier gas, causing gas clotting on the filter 4. In the case of a biological filter, especially if the carrier gas is oxygen, its operation deteriorates.

According to the invention, the installation I comprises a liquid/gas exchange tower 7. In the case of an existing installation which is refurbished, any gas delivery rails in the bottom of the tank 2 become useless and can be eliminated. In the case of a new installation, no rail is provided in the bottom of the tank 2.

The exchange tower 7 consists, for example, of a cylindrical stainless steel column capable of withstanding the high ozone concentrations and absolute pressures above 3 bar (or 300 kPa). The geometric axis of the tower 7 is vertical. Said tower 7 advantageously comprises an internal packing 8, formed for example of Raschig rings, or ceramic elements, granules or equivalent means, promoting the gas/liquid contact and the transfer of gas to the liquid, while permitting the gas to flow upward and the liquid downward. The height of the tower 7 may be not more than about two meters. The tower 7 is closed at the top and at the bottom.

A fraction of the main water stream is diverted upstream of the filtration 4, downstream of the clarification tank 1 and upstream of the contact tank 2 via the branch of a conduit 9 on the line 3. The conduit 9 is connected to the suction port of a pump 10 whereof the discharge port is connected to a line 11 extending to the top of the tower 7. The line 11 is connected to a liquid delivery rail 12 in the upper part of the tower 7.

The diverted fraction of stream tapped off by the conduit 9 comprises between 1% and 50% of the main stream, preferably between 5% and 10%, advantageously about 7.5%. The diverted fraction of water, pressurized by the pump 10, is delivered to the tower 7 under a pressure preferably close to 2.3 bar absolute.

An ozone-rich carrier gas is injected at the bottom of the tower 7 via a line 13 which is connected upstream, to the outlet of an ozonizer 14. Advantageously, the ozonizer 14, rather than being supplied with air, is supplied with oxygen, for example from a tank 15 containing pressurized oxygen or liquid oxygen; the carrier gas is oxygen in this case.

The ozone concentration in the oxygen is preferably higher than 10% by weight and may be up to 20% with an efficient ozonizer 14.

Although the transfer of the ozone to the water takes place with a high yield in the tower 7, part of the ozone escapes. This part is recovered at the top of the tower 7 by a line 16 fitted with a valve 17 and connected, downstream, to an ozone destroyer 18, in order to prevent pollution of the environment by the ozone released.

In the bottom of the tower 7, the ozone-enriched diverted fraction of water is collected by a line 19 fitted with a valve 20. The line 19 extends beyond the valve 20 and is immersed, substantially vertically, in the upstream part of the contact tank 2. The line 19 terminates in the bottom of the tank 2, to permit the dilution of the ozone-enriched fraction in the tank water. Stirring means (not shown) may be provided to promote dilution.

Advantageously, the part of the contact tank 2 located upstream is prepared in the form of a dissolution tank 21 which comprises an upstream chamber 21a bounded by the upstream vertical transverse wall 2a of the tank and by a vertical partition 21b parallel to the wall 2a at a distance therefrom. The height of the partition 21b is lower than the water height in the tank. The partition 21b is connected tightly to the longitudinal walls of the tank 2 so that the passage of the water from the chamber 21a downstream must take place above the upper edge of the partition 21b. At a distance from said partition 21b another vertical parallel partition 21c is provided, extending above the water level in the tank 2 and stopping at a distance from the bottom of the tank, so that a passage 22 subsists in the bottom portion. A baffle is thereby formed by the walls 21b, 21c promoting the mixing and the dilution of the ozone-enriched fraction of water in the main stream.

The implementation of the method and the operation of the installation are as follows.

The exchange tower 7 behaves like a saturator and serves in particular to solve the most important problem, which is to limit the supersaturation of carrier gas in the water treated in the filters. The tower 7 serves to exploit the fact that, at the same partial pressure, the solubility of ozone in water is more than ten times greater than that of oxygen. More precisely, the solubility of ozone in water is about 13.3 times greater than that of oxygen.

Thus by saturating a diverted fraction of about 7.5% of the main stream of treated water with ozone, it is possible to inject all the desired ozone into the main stream while limiting the injection of oxygen (carrier gas) and hence the supersaturation with oxygen.

The stream of water to be treated enters the clarification tank 1 and leaves it, after clarification, via the conduit 3.

The diverted fraction, taken up and discharged by the pump 10 at the top of the tower 7, flows into the tower in counter-current to the ozone-enriched oxygen which is injected at the bottom of the tower 7. The ozone is transferred to the water with a high yield particularly thanks to the packing 8. The efficiency of the ozone transfer in the diverted fraction of water may be up to 92% by weight.

The surplus ozone is removed via the conduit 16 to the destroyer 18.

The increase in the efficiency of transfer of ozone to the water with the tower 7, compared with a system diffusing gas bubbles in the bottom of the contact tank, is associated with several factors, in particular:

- the transfer pressure in the tower 7 is higher, generally higher than 2.3 bar absolute, and remains constant throughout the tower, while the pressure applied to bubbles in a tank is low, for example about 1.4 bar at the injection point, and decreases progressively as the bubbles rise, to reach about 1 bar absolute at the water surface;
- the area offered to the transfer mechanism is substantially higher in the tower 7 thanks to the packing 8;
- the residence time of the carrier gas in the tower 7 is relatively long and may be about ten minutes, whereas it is only about twenty seconds for fine bubbles in a conventional tank.

The diverted fraction, diluted in the tank 2, permits effective ozonization of the total stream, without supersaturation with oxygen which is detrimental to the filter 4.

The improved efficiency results in large energy savings in ozone production because it now makes it possible to use oxygen as carrier gas using this invention.

The invention also serves to realize savings in equipment and civil work because, in the case of a new installation, it avoids the construction of a tank with diffusers in the bottom.

The running of the installation is made more flexible because, in the case in which the contact tank 2 must be shut down, the ozone-enriched fraction of water can be injected in pre- or post-treatment, instead of the inter-treatment injection, by merely modifying the line 19 to make it terminate, for example, in the tank 1 or downstream of the filter 4.

Two exchange towers 7 in parallel may be provided, so that, during maintenance operations on one tower, the other tower continues to operate to avoid interrupting production on the installation.

A nonlimiting numerical example is provided below simply to provide some orders of magnitude.

The flow of water to the clarification tank 1 may be about 100 000 m$^3$/day.

The flow of ozone to be injected for treating this main stream is estimated at 360 kg/day. The mass transfer efficiency of the tower 7 is estimated at about 92%. It is therefore necessary to inject about 400 kg/day of ozone in the bottom of the tower 7. Assuming that the carrier oxygen contains about 10% by weight of ozone, the oxygen flow must be about 3600 kg/day.

Due to the differences in solubility between ozone and oxygen in water, the oxygen concentration of the diverted fraction collected in the line 19 is low, and the flow of oxygen injected into the total stream is only about 500 kg/day, thereby limiting the supersaturation with oxygen.

Although the example described relates to an installation and a method for treating drinking water, the invention may be applied to any water treatment involving ozonization, which requires reducing the supersaturation with the gases.

The invention claimed is:

1. A method for treating water comprising an ozonization step, a clarification step, and at least one filtration step, wherein:

downstream of a clarification tank (1), that clarifies a main water stream in the clarification step, and upstream of a contact tank (2), having a dissolution chamber, via a branch of a conduit (9) on a line (3) connecting the clarification tank (1) to the contact tank (2), a fraction of the main water stream, which is between 5% and 10% of the water stream, is diverted, said fraction of water is pressurized to a pressure about 2.3 bars absolute, delivered to a liquid/gas exchange tower (7), and saturated with ozone at the pressure in the exchange tower, wherein the ozone is present in an oxygen carrier gas at a concentration between 5% and 10% by weight, the carrier gas is directly injected at a bottom of the exchange tower, and about 92% by weight of the ozone in the carrier gas is transferred into the diverted fraction of water, an untransferred part of the carrier gas is extracted, and surplus ozone at the top of the tower (7) is recovered by a line (16) connected to an ozone destroyer (18), and the ozone-saturated fraction of water is diluted in the main stream within the dissolution chamber in the ozonization step, wherein the dissolution chamber is formed in an upstream portion of the contact tank (2), a filter (4) being provided after the contact tank (2) that filters the main stream in the filtering step.

2. The method as claimed in claim 1, wherein the fraction of the main water stream that is diverted is 7.5% of the main water stream.

* * * * *